US 6,644,116 B2

(12) United States Patent
Getman et al.

(10) Patent No.: US 6,644,116 B2
(45) Date of Patent: Nov. 11, 2003

(54) DEVICE FOR DETERMINING AND/OR MONITORING THE LEVEL OF A MEDIUM IN A CONTAINER

(75) Inventors: Igor Getman, Lörrach (DE); Sergej Lopatin, Lörrach (DE); Armin Rupp, Weil am Rhein (DE); Bernd Kastner, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/174,486

(22) Filed: Jun. 19, 2002

(65) Prior Publication Data

US 2003/0010114 A1 Jan. 16, 2003

(30) Foreign Application Priority Data

Jun. 19, 2001 (DE) .......................................... 101 29 556

(51) Int. Cl.[7] .......................... G01F 23/28; G08B 21/00
(52) U.S. Cl. ...................... 73/290 V; 73/32; 73/290 R; 340/620; 340/621
(58) Field of Search ........................... 73/290 V, 290 R, 73/32; 340/620, 621

(56) References Cited

U.S. PATENT DOCUMENTS

| | | | | | |
|---|---|---|---|---|---|
| 3,339,400 A | * | 9/1967 | Banks | .......................... | 73/32 A |
| 3,385,104 A | * | 5/1968 | Banks | .......................... | 73/580 |
| 3,625,058 A | * | 12/1971 | Dress et al. | .............. | 73/290 V |
| 4,594,584 A | * | 6/1986 | Pfeiffer et al. | .............. | 340/620 |
| 5,191,316 A | * | 3/1993 | Dreyer | ........................ | 340/621 |
| 5,247,832 A | * | 9/1993 | Umezawa et al. | ........ | 73/290 V |
| 5,408,168 A | * | 4/1995 | Pfandler | ...................... | 318/642 |
| 5,625,343 A | * | 4/1997 | Rottmar | ...................... | 340/620 |
| 5,631,633 A | * | 5/1997 | Dreyer et al. | ................ | 340/621 |
| 5,644,299 A | * | 7/1997 | Cruickshank | ............... | 340/617 |
| 5,709,558 A | * | 1/1998 | Dreyer et al. | ................. | 439/95 |
| 5,717,383 A | * | 2/1998 | Dreyer et al. | ............... | 340/621 |
| 5,743,134 A | * | 4/1998 | Dreyer | ..................... | 73/290 V |
| 5,895,848 A | * | 4/1999 | Wilson et al. | ............. | 73/290 V |
| 5,969,621 A | * | 10/1999 | Getman et al. | ............. | 340/621 |
| 6,389,891 B1 | * | 5/2002 | D'Angelico et al. | ...... | 73/290 V |

FOREIGN PATENT DOCUMENTS

| | | |
|---|---|---|
| DE | 4118793 | 4/1995 |
| DE | 19804998 | 8/1999 |
| DE | 19814669 | 10/1999 |
| EP | 0810423 | 3/1998 |

* cited by examiner

Primary Examiner—Hezron Williams
Assistant Examiner—Katina Wilson
(74) Attorney, Agent, or Firm—Jones, Tullar & Cooper, P.C.

(57) ABSTRACT

A device for determining and/or monitoring the level of a medium in a container or for ascertaining the density of a medium in the container embodied as a vibration detector. According to the invention the vibration detector still functions reliably even under extreme process conditions and upon abrupt changes in process conditions. The vibration detector has a tubular inner part provided, which is dimensioned such that it is positioned between the housing wall and a drive/receiving unit, and that the tubular inner part is connected to the housing or to the diaphragm.

8 Claims, 3 Drawing Sheets

DEVICE FOR DETERMINING AND/OR MONITORING THE LEVEL OF A MEDIUM IN A CONTAINER

FIELD OF THE INVENTION

The invention relates to a device for determining and/or monitoring the level of a medium in a container or for ascertaining the density of a medium in the container.

The device is embodied as a vibration detector having a housing, a diaphragm, an osciliatable unit, a drive/receiving unit, and a regulating/evaluating unit. The diaphragm closes one end face of the housing, the oscillatable unit is secured to the diaphragm, and the drive/receiving unit is disposed in the interior of the housing such that it causes the diaphragm and the oscillatable unit to oscillate, and detect the oscillations, and the regulating/evaluating unit, from the detected oscillations, detects the attainment of the predetermined level or ascertains the density of the medium.

PRIOR ART

Such vibration detectors are known in different versions. The oscillatable unit is at least one oscillatory rod, which—as already noted—is secured directly to a diaphragm. The diaphragm is induced to oscillate via an electromechanical converter, such as a piezoelectric element. Because of the oscillations of the diaphragm, the oscillatable unit secured to the diaphragm also executes oscillations.

Vibration detectors embodied as fill level measuring instruments exploit the effect that the oscillation frequency and oscillation amplitude are dependent on the particular degree of coverage of the oscillatable unit: While the oscillatable unit in air can execute its oscillations freely and without damping, it does undergo a change of frequency and amplitude as soon as it dips partway or all the way into the product filling the container. From a predetermined frequency change (typically, the frequency rather than the amplitude is measured), an unambiguous conclusion can accordingly be drawn as to whether a predetermined fill level of a product in the container has been attained. Fill level measuring instruments of this type are moreover primarily used as means to secure against overfilling or for the sake of preventing a pump from running empty.

Moreover, the damping of the oscillation of the oscillating element is affected by the density of the particular product as well. For a constant degree of coverage of the at least one oscillating element, there is a functional relationship with the density of the product, making vibration detectors extremely well suited for detecting a predetermined limit state as well as for detecting density.

In practice, to monitor and detect the level or density of the product in the container, the oscillations of the diaphragm are picked up and converted into electrical reception signals. A piezoelectric element is typically used for this. The electrical reception signals are then evaluated by an electronic evaluator. In the case of level determination, the electronic evaluator monitors the oscillation frequency and/or the oscillation amplitude of the oscillatable unit and signals that the state is either "sensor covered" or "sensor uncovered", as soon as the measured values undershoot or overshoot a predetermined reference value. This can be reported accordingly to the operating staff visually and/or acoustically. Alternatively or in addition, a switching operation is tripped; an inflow or outflow valve, for instance, on the container is then opened or closed.

From European Patent Disclosure EP 0 810 423 A2, a vibration-fill level limit switch has been disclosed in which the piezoelectric element is prestressed in the interior of the housing between a pressure plate and the center of the diaphragm. The pressure plate is braced on a securing ring that is disposed in an annular groove on the inside of the housing. A comparable embodiment of a vibration limit switch is described in German Patent Disclosure DE 198 14 669 A1: Once again, the drive element—a piezoelectric stack—is prestressed between the diaphragm and a yoke part. Here as well, the yoke part is braced directly on the housing. For that purpose, stop parts are provided on the inner wall of the housing.

In the vibration detectors that have been disclosed, functional problems arise if the process conditions abruptly change, and especially if the process temperature suddenly rises. In the high-temperature range, process temperatures up to about 300° C. can furthermore occur. If the process temperature increases suddenly—that is, if a temperature shock occurs—then the housing or so-called sensor tube expands much faster than the parts located inside the housing, which means the piezoelectric element or piezoelectric stack and the pressure plate or yoke part. As a consequence, the extremely undesirable situation ensues that the piezoelectric drive is no longer in mechanical contact with the diaphragm, or that the set prestressing between the piezoelectric drive and the diaphragm is lost. The vibration detector then functions only incorrectly or not at all. Only once the parts located in the interior of the housing have also been heated to the process temperature is the specified prestressing between the piezoelectric drive and the diaphragm restored, and the vibration detector is then fully functional again. Detector failures caused by a temperature shock can last on the order of magnitude of several minutes. This length of time is naturally entirely unacceptable for a limit state detector that is used to prevent against overfilling or against running empty.

SUMMARY OF THE INVENTION

The object of the invention is to provide a device that functions reliably even upon abrupt changes in the process temperature.

This object is attained in that a tubular inner part is provided, which is dimensioned such that it is positioned between the housing wall and the drive/receiving unit, and that the tubular inner part is connected to the housing or to the diaphragm.

Depending on the embodiment of the device of the invention, the parts disposed inside the housing, in particular the prestressed drive/receiving unit, are completely or partly decoupled thermally from the housing by the tubular inner part. If a temperature shock occurs, the housing heats to the process temperature relatively fast. However, it takes a relatively long time until the tubular inner part and the drive/receiving unit assume the altered process temperature. This is due to the poor thermal conductivity of the air in the air gap between the tubular inner part and the housing wall and of the tubular inner part and the drive/receiving unit, which in the high-temperature range is preferably made from piezoceramic materials. To guarantee high corrosion resistance, the housing and the tubular inner part of the vibration detector are moreover both made from stainless, acid-resistant steel. Because of the thermal decoupling of the housing and the drive/receiving unit provided according to the invention, the different thermal expansion of the individual parts does not impair the proper function of the vibration detector.

In a preferred feature of the device of the invention, the tubular inner part is connected to the housing or to the diaphragm in a defined region. The fastening of the tubular inner part to the diaphragm or the housing—in the latter case, the connection is preferably made in the vicinity of the diaphragm—is optimal, since in the event of a sudden temperature increase, the heat can spread evenly over the tubular inner part and the drive/receiving unit.

In an advantageous refinement of the device of the invention, the tubular inner part, in the region of the connection of the tubular inner part and the housing, has a beadlike ring, whose outer edge in the installed state is located essentially in the same plane as the outer wall of the housing. The connection between the tubular inner part and the housing, or between the tubular inner part and the diaphragm, is preferably done by welding. It is understood, however, that a screw connection or any alternative way of connecting the individual parts to one another can also be employed.

In a preferred embodiment of the device of the invention, the drive/receiving unit is a piezoelectric stack composed of at least two piezoceramic disklike elements; one disklike element functions as a drive unit, while the other disklike element functions as a receiving unit. The most various drive/receiving units are already known from the prior art. It is self-evident that in conjunction with the present invention, all types of drive/receiving unit can be used. As especially advantageous features, drive/receiving units that are used in vibration detectors offered for sale and distributed by the present Applicant under the tradename "Liquiphant" can be named.

One favorable feature of the device of the invention is that the drive/receiving unit is positioned between the diaphragm and a fastening part, the latter being braced on the inner wall of the housing or on the tubular inner part. The fastening part is preferably a pressure screw, with which the desired prestressing between the drive/receiving unit and the diaphragm can be preset.

In the case where the fastening part is braced on the tubular inner part, care must be taken that the material comprising the tubular inner part have a coefficient of thermal expansion that is as similar as possible to the coefficient of thermal expansion of the piezoelectric drive and the fastening part. However, if a defined, sufficiently great prestressing is selected, then it is entirely possible to select materials for the individual parts that are not so well adapted to one another in terms of their coefficients of thermal expansion. Preferably, however, the housing, tubular inner part and fastening part, for instance the pressure screw, are all of the same material, such as stainless and acid-resistant steel. In this connection, it can be noted that the coefficient of thermal expansion of a piezoelectric material and the coefficient of thermal expansion of stainless and acid-resistant steel are approximately the same.

In the event that the fastening part is braced directly on the housing, the vibration detector will function reliably well after a temperature shock only if the housing comprises a material that does not expand, or expands only minimally, as a function of the temperature. Materials such as Inwar and Kowar have this property. The disadvantage of these materials is without doubt their limited applicability: Inwar and Kowar materials are known to be less corrosion-resistant.

If the fastening part is braced on the tubular inner part, then an advantageous refinement proposes that the tubular inner part, on the end region remote from the diaphragm, has a female thread, and that the fastening part is a pressure screw that has a male thread corresponding to the female thread of the tubular inner part. It is understood that for locking the fastening part to the tubular inner part, the types of fastening known from the prior art for prestressing the drive/receiving unit can also be used analogously.

BRIEF DESCRIPTION OF THE DRAWINGS

A preferred feature of the device of the invention is that the drive/receiving unit is part of a module that can be inserted into the housing by the tubular inner part.

The invention will be explained in further detail in conjunction with the accompanying drawings. Shown are.

DESCRIPTION OF THE PREFERRED EMBODIMENTS

Figure 1:
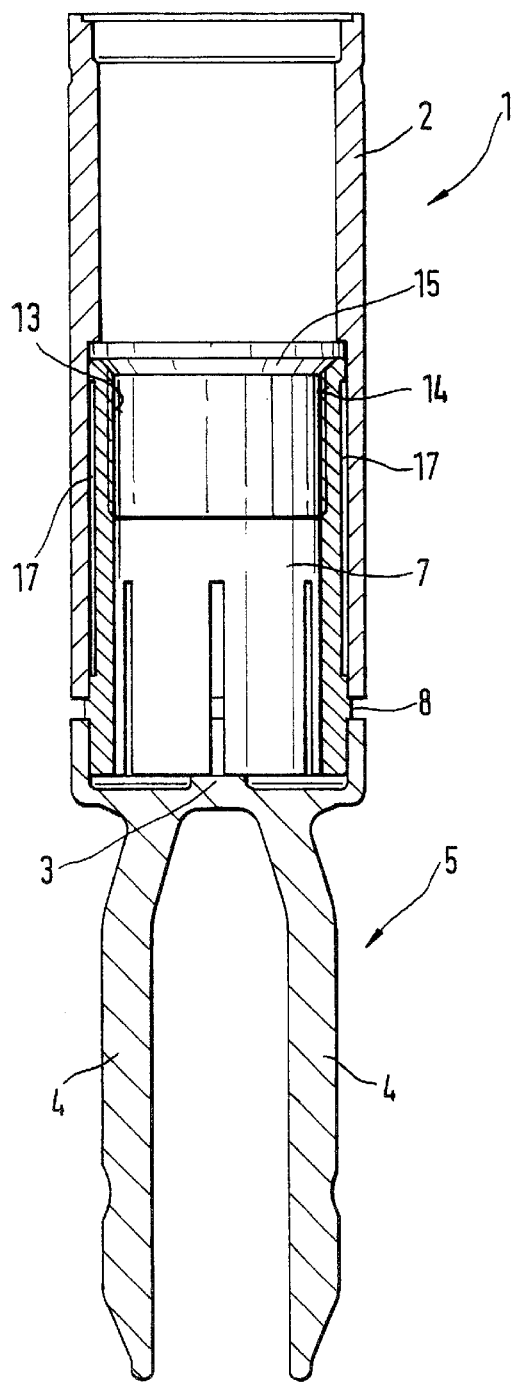
FIG. 1. which is a schematic illustration of a first embodiment of the device of the invention.
Figure 2:
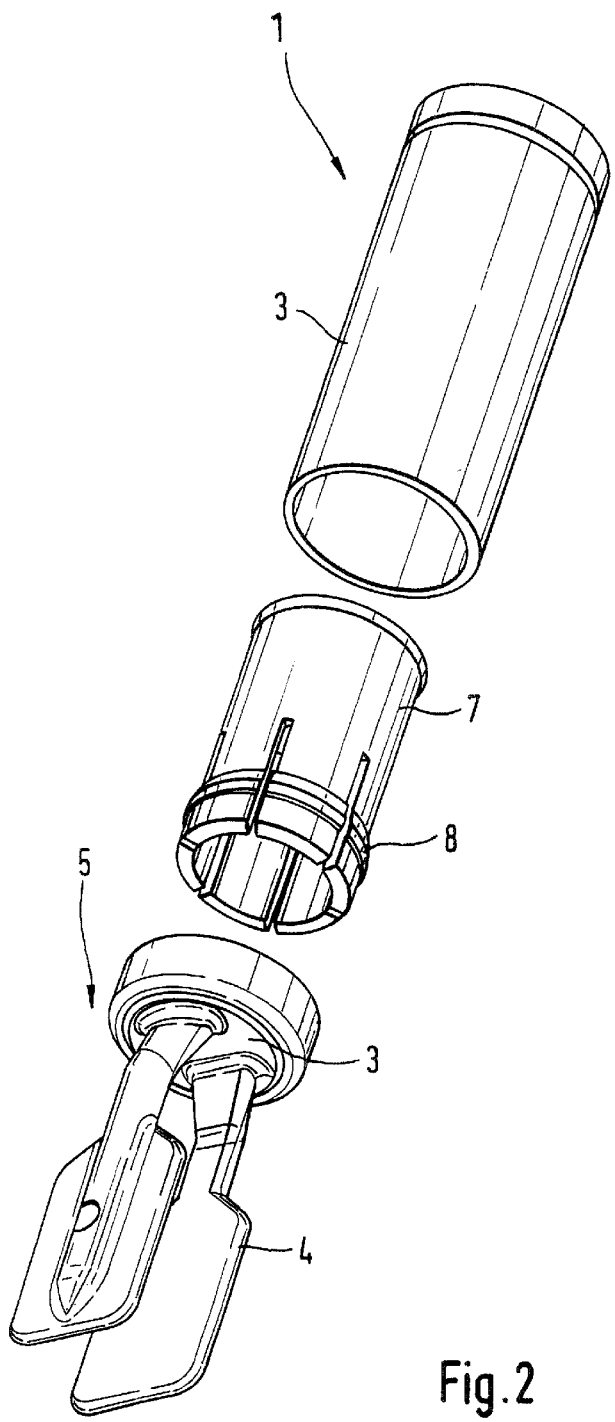
FIG. 2. which is an exploded view of the first embodiment of the device of the invention.

FIG. 1 shows a schematic illustration of a first embodiment of the device according to the invention; in FIG. 2, this embodiment can be seen in an exploded view. The vibration detector 1 comprises a housing 2, a tubular inner part 7, and an oscillatable unit 5, which is fastened to a diaphragm 3. In the case shown, the oscillatable unit 5 comprises an oscillating fork with two oscillatory rods 4. The tubular inner part 7 has an annular bead 8, whose outer edge in the installed state is essentially flush with the outer surface of the housing 2. In the region of the annular bead 8, the housing 2, tubular inner part 7 and diaphragm 3 are welded to one another and to the oscillatable unit 5 secured to the diaphragm. The advantage of joining the three parts together by a connection such as a weld seam is considered to be that the tubular inner part, in particular, can expand freely and unhindered as a function of temperature. The weld seam or connecting region is preferably located in the vicinity of the diaphragm 3. This type of connection assures that heat, in the event of an abrupt increase in the process temperature, will spread uniformly over the tubular inner part 7 and the piezoelectric drive, not shown separately in FIGS. 1 and 2.

As can be seen from FIG. 2, a plurality of slits 23 are provided on the tubular inner part 7. This has advantages especially whenever the housing 2 and diaphragm 3, with the osdillatable unit 5 fastened to the latter, are made from a different material than that of the tubular inner part 7. In that case, it can happen that the tubular inner part 7 will expand more slowly than the other parts 2, 3, 5. The tubular inner part 7 then holds the other parts 2, 3, 5 quasi-firmly and seeks to prevent them from expanding. Strains that are beyond the allowable limit values can then occur m the material comprising the parts 2, 3, 5 or in the weld seam. The slits 23 lend the tubular inner part 7a resilient effect; it can expand outward more easily with the other parts 2, 3, 5. The strains in the weld seam are reduced, so that they again come to be below the allowable limit value.

If as shown in these drawings a pressure screw 15 that prestresses the piezoelectric drive is firmly fastened to the tubular inner part 7, the parts disposed in the interior of the housing 2 expand evenly and independently of the housing 2. The set prestressing of the piezoelectric stack therefore stays at least within the scope of specified tolerances. As a result, it is assured that the vibration detector 1 will always furnish reliably correct measured values even under extreme conditions. As already noted earlier herein, it is especially advantageous if the materials that comprise the tubular inner part 7 and the fastening part, in this case the pressure screw 15, have a coefficient of thermal expansion similar to that of the piezoelectric material comprising the drive/receiving unit.

Figure 3:
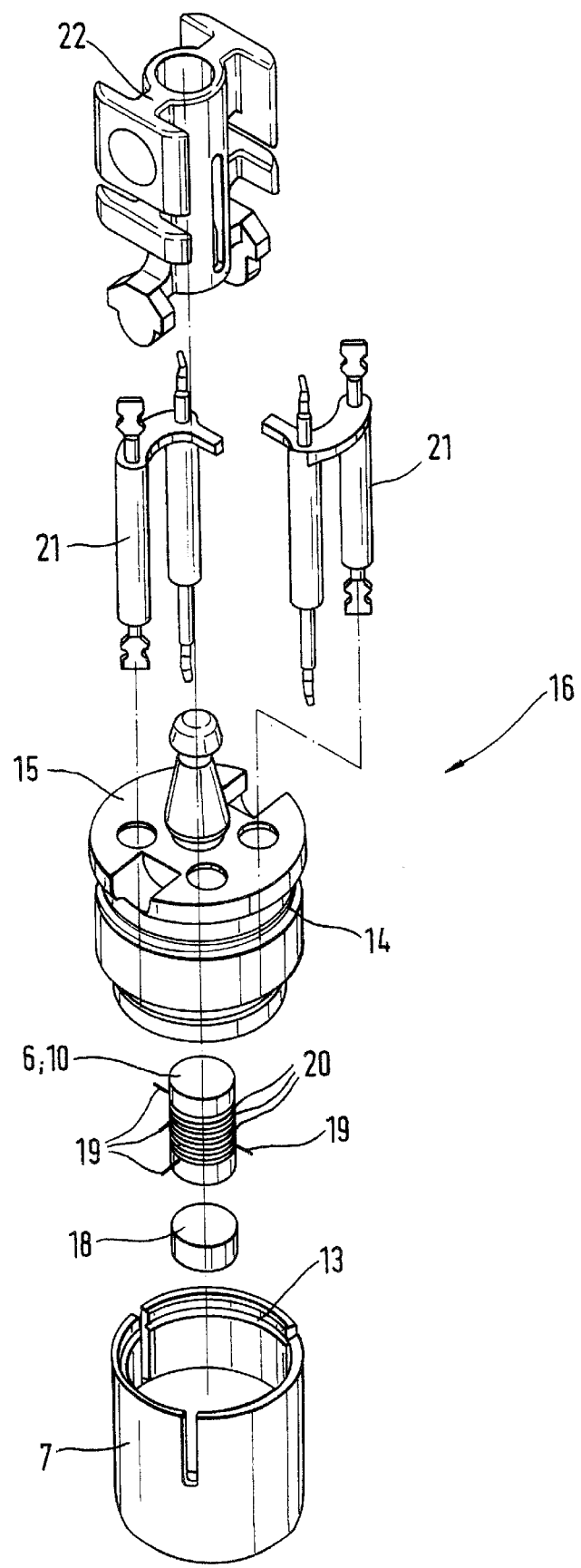
FIG. 3. which is an exploded view of the module that can be used in the device of the invention.

FIG. 3 shows an exploded via of a module 16 that is preferably used in conjunction with the present invention. The piezoelectric stack 10 is disposed in the tubular inner part 7. This piezoelectric stack 10 represents the preferred embodiment of the drive/receiving unit 6 for the vibration detector 1. The individual piezoelectric disklike elements 20 of the piezoelectric stack 10 preferably comprise a piezoceramic material, which is also suitable for use in the high-temperature range.

The piezoelectric stack 10 is in contact with the diaphragm 3 via a die 18. The die 18 facilitates centering the piezoelectric stack 10 relative to the diaphragm 3. Contact lugs 19, which are formed on disklike piezoelectric elements 20 and extended to the outside, serve to provide electrical contact.

The pressure screw 15 has a male thread 14, which corresponds to the female thread 13 of the tubular inner part 7. The piezoelectric stack 10 is positioned via the pressure screw 15 in such a way that it acts on the diaphragm 3 with a defined prestressing.

The two connection parts 21 likewise serve to provide electrical contact. Via the shaped part 22, the electrical connecting lines, not shown separately in FIG. 3, are additionally stabilized. Moreover, the shaped part 22 facilitates the installation—in the case shown, tightly screwing—the module 16 in the housing 2.

Figure 4:
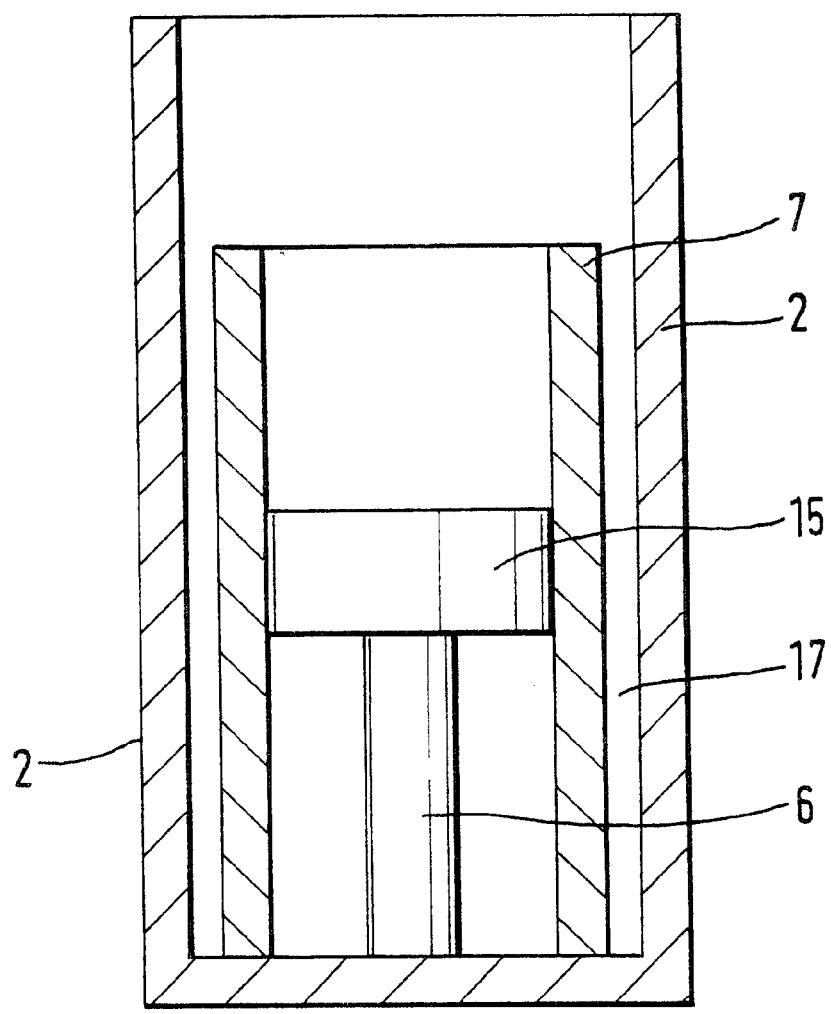
FIG. 4. which is a schematic illustration of a second embodiment of the device of the invention.

In FIG. 4, a schematic illustration of a second embodiment of the vibration detector 1 of the invention can be seen. While in the embodiment shown in FIGS. 1, 2 and 3, the tubular inner part 7 is fastened to the housing 2, in this second embodiment the tubular inner part 7 is fastened directly to the diaphragm 3.

What is claimed is:

1. A device for determining and/or monitoring the level of a medium in a container or for ascertaining the density of a medium in the container, having: a housing, defining a wall and end faces; a diaphragm; an oscillatable unit; a drive/receiving unit; a tubular inner part; and a regulating/evaluating unit, wherein:

said diaphragm closes one end face of said housing, said oscillatable unit is secured to said diaphragm, said drive/receiving unit is disposed in the interior of the housing such that it causes said diaphragm and the oscillatable unit to oscillate, detect the oscillations, said regulating/evaluating unit detects, from the detected oscillations, the attainment of the predetermined level or ascertains the density of the medium, said tubular inner part is dimensioned such that it is positioned between said housing wall and said drive/receiving unit, and said tubular inner part is connected to one of: said housing and said diaphragm in order to thermally decouple said drive/receiving unit from said housing.

2. The device of claim 1, further wherein: said tubular inner part is welded or screwed to one of: said housing and said diaphragn in a defined region.

3. The device of claim 1, further wherein: the connection between said tubular inner part and said housing or diaphragm is located in the end region, toward said diaphragm, of said housing.

4. The device of claim 1, further wherein: said drive/receiving unit is a piezoelectric stack composed of at least two piezoceramic dislike elements.

5. The device of claim 1, further wherein: said drive/receiving unit or said piezoelectric stack is positioned between said diaphragm and a fastening part, which fastening part is braced on said housing or on said tubular inner part.

6. The device of claim 5, further wherein: said tubular inner part, on the end region remote from said diaphragm, has a female thread, and said fastening part is a pressure screw that has a male thread corresponding to the female thread of said tubular inner part.

7. The device of claim 1, further wherein: said drive/receiving unit or the piezoelectric stack is part of a module that is insertable into said housing by said tubular inner part.

8. A device for determining and/or monitoring the level of a medium in a container or for ascertaining the density of a medium in the container, having: a housing, defining a wall and end faces; a diaphragm; an oscillatable unit; a drive/receiving unit; a tubular inner part; and a regulating/evaluating unit, wherein:

said diaphragm closes one end face of said housing, said oscillatable unit is secured to said diaphragm, said drive/receiving unit is disposed in the interior of the housing such that it causes said diaphragm and the oscillatable unit to oscillate, detect the oscillations, said regulating/evaluating unit detects, from the detected oscillations, the attainment of the predetermined level or ascertains the density of the medium, said tubular inner part is dimensioned such that it is positioned between said housing wall and said drive/receiving unit, and said tubular inner part is connected to one of said housing and said diaphragm; and said tubular inner part, in the region of the connection of said tubular inner part and said housing or diaphragm, has a beadlike ring, whose outer edge in the installed state is located essentially in the same plane as the outer wall of said housing.

* * * * *